Patented Dec. 22, 1942

2,305,683

UNITED STATES PATENT OFFICE 2,305,683

METHOD OF CONTINUOUSLY PRODUCING GLASS HAVING A PLURALITY OF LAYERS

Bernhard Engels, Waldenburg-Altwasser, Germany; vested in the Alien Property Custodian No Drawing. Application July 18, 1938, Serial No. 219,907. In Germany July 19, 1937

1 Claim. (Cl. 49—82)

This invention relates to a method of continuously producing glass having a plurality of layers, as covered by my American Patent No. 1,910,759, and constitutes an improvement of the older method according to which glass of this type, particularly flashed glass, is made by bringing the glass forming the covering layer upon or onto the surface of a band of glass and drawing the glass upwardly in vertical direction out of a fused mass.

My older method avoids the drawbacks of other known methods proposed for making flashed glass. According to one of these methods, two or more layers of glass are formed by rolling, each of which is strong enough to be used as an independent sheet and which are then united, and another method consists in feeding the covering glass of suitable quality and regulatable thickness to a downwardly flowing band of glass during the process of producing the latter. Under both of these known methods it is, however, not possible to produce glass having several layers, and particularly flashed glass, in which the covering layers, usually serving merely for giving a color effect to the glass, are made so thin that they cannot exist separately.

Other known methods are open to the objection that they do not permit the production of glass having several layers which are uniformly arranged upon one another without intermixing.

My first-mentioned older method which avoids already all drawbacks of the known processes is further improved and perfected by the present invention, particularly with respect to its range of application and greater economy.

The invention, besides providing for other possibilities to be discussed below, makes it possible for instance to produce very thin covering layers having so to speak merely a painting or coloring effect and forming coatings whose thickness might amount to not more than a fraction of a millimeter. It has been found that in order to attain this effect special working conditions in connection with the older method are required and that in particular the glass to be flashed on should have a lower, preferably much lower, degree of viscosity or higher temperature than the basic glass at the moment when both glasses are assembled.

This requirement can be met in various ways according to circumstances.

For example, if a basic glass is to be colored by flashing, which is the normal case, it is advisable not to provide for too great differences in temperature between both glasses when they are brought together, as otherwise harmful tensions might appear during the subsequent cooling step. In such instances the lower viscosity of the glass to be flashed on is of course obtainable by a corresponding chemical composition of it, i. e., by adding the usual fluxing materials for lowering the melting point, so that at equal or approximately equal temperatures the basic glass for instance may be already in the highly viscous state desirable to insure uniform drawing of the same from the reservoir in upward direction and the glass to be flashed on having no appreciable higher temperature than the other is highly liquid and on being applied to the basic glass merely paints it as it were, i. e., just covers it with a film.

In certain instances it may be desirable to produce different stresses in the basic and flashing glasses to subject the basic glass to increased compressive stresses due to greater contraction of the glass to be flashed on and thereby to attain an effect approximately comparable to that obtained in tempering glass by chilling the surface layers of the glass heated close to its re-softening point. This latter possibility covers additional uses of the new method by permitting the production of a glass which matches very nearly tempered glass with respect to higher elasticity, resistance to shock and form of fracture, it being merely necessary to suitably overcome the difficulties involved in separating the flashed glass produced in this manner from the glass band in view of the tempered condition of the same.

If for the reasons stated great differences in temperature need not be avoided but may be rather desirable, it is also possible to bring even flashing glass heated to a relatively high temperature on.o an already cooled and therefore thickened basis glass or of course to combine both steps, viz. the lowering of the melting point and the increase in temperature of the flashing glass.

The invention thus provides advantageous possibilities of controlling the thickness as well as the properties of the layers of flashed glass, and its application is not restricted to the production of colored flashed glass but includes also the arrangement of uncolored layers on a basis glass in the manner described to obtain particularly desirable effects.

The thickness of the layers applied can be regulated as required by a corresponding adjustment of operating conditions within the scope of the fundamental principle of the invention, for instance by providing for proper differences in viscosity, altering drawing speed, etc.

It is further possible of course to apply after the first coating additional layers.

The device for performing the improved method according to the invention conforms in principle to the one disclosed in my American patent mentioned, apart from additional means for controlling the degree of viscosity, particularly of the glass that is to be flashed on.

The invention is not limited to the embodiment described, but may be varied in many ways without departing from its fundamental idea.

I claim:

A method of continuously producing flashed glass having very thin flashing layers comprising drawing a basic layer of glass in strip form upwardly from a bath, heating the flashing glass to a temperature higher than the basic layer, said flashing glass having a lower fusion point than said basic layer, applying the flashing glass against the surface of said basic layer, whereby the flashing glass is cooled locally and adheres to the basic glass strip in a thin layer, and the flashing glass being of such a composition that it has a higher coefficient of expansion than the glass of said basic layer, whereby during cooling the flashing glass contracts more than the basis glass strip causing increased compressive stresses in the basic glass strip.

BERNHARD ENGELS.